Oct. 7, 1958     D. Z. ROBINSON ET AL     2,855,522
METHOD AND APPARATUS FOR LONG
WAVE-LENGTH INFRA-RED VIEWING

Filed April 30, 1953     3 Sheets-Sheet 1

Inventors:
David Z. Robinson
Arthur P. DiMattia
Gene W. McDaniel
Richard L. Collette
by
Minna V. Hamilton
Attorney

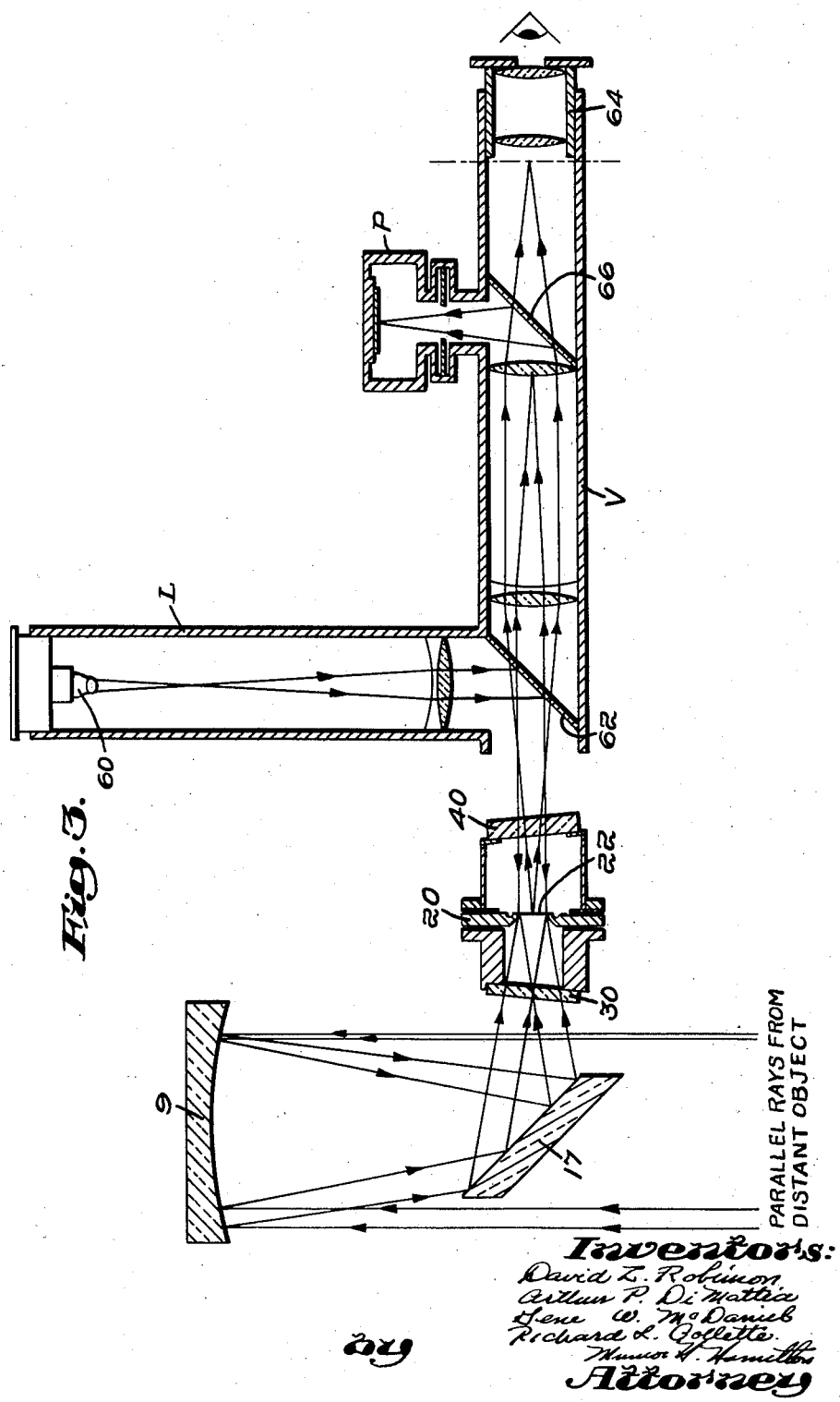

Oct. 7, 1958
D. Z. ROBINSON ET AL
2,855,522
METHOD AND APPARATUS FOR LONG
WAVE-LENGTH INFRA-RED VIEWING
Filed April 30, 1953
3 Sheets-Sheet 3
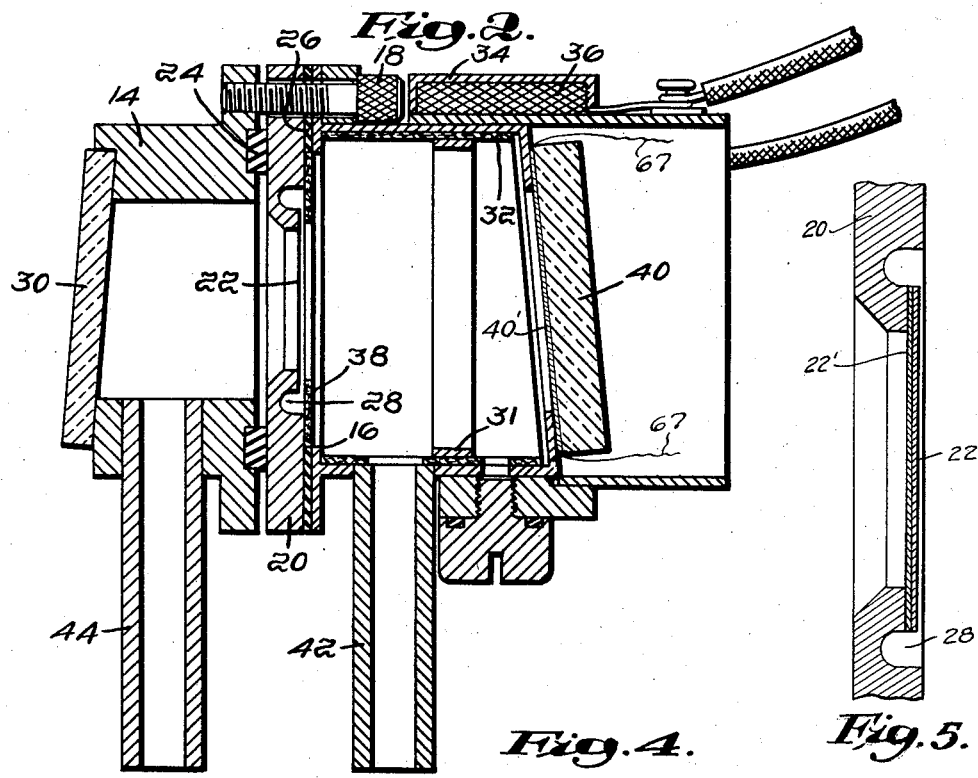
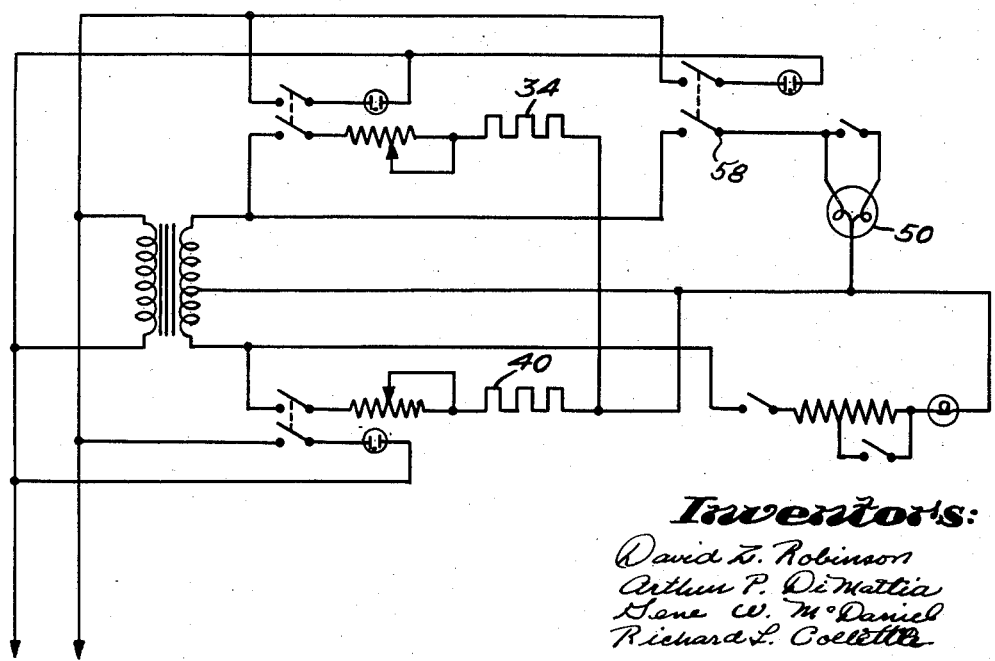
Inventors:
David Z. Robinson
Arthur P. DiMattia
Gene W. McDaniel
Richard L. Coulette
by
Attorney

United States Patent Office 2,855,522
Patented Oct. 7, 1958

2,855,522

METHOD AND APPARATUS FOR LONG WAVE-LENGTH INFRA-RED VIEWING

David Z. Robinson, Cambridge, Arthur P. Di Mattia, Arlington, Gene W. McDaniel, Watertown, and Richard L. Collette, Reading, Mass., assignors to Baird Associates, Inc., Cambridge, Mass., a corporation of Massachusetts Application April 30, 1953, Serial No. 352,106

18 Claims. (Cl. 250—83.3)

This invention relates to improvements in methods and apparatus for long wave-length infra-red viewing, and particularly infra-red viewing of that type in which there has been employed a device referred to in the art as an "Evaporograph."

An evaporograph, as heretofore known, has generally comprised a specially formed membrane which is exceedingly thin. On one side of this membrane is provided a layer of a substance capable of absorbing infra-red rays and becoming raised in temperature. On the other side of the membrane is a thin film of material, such as an oil, which is capable of undergoing evaporation. When the absorbing layer is exposed to infra-red radiations the oil film will, at points coinciding with the areas of the absorbing layer warmed by infra-red rays, evaporate and decrease in thickness very slightly. The small thickness differences between the film of oil at the heated areas and at adjacent unheated areas are observed by light interference and become visually evident through change in color values at the evaporated oil areas.

In these earlier devices proposed such as, for example, the evaporograph cell construction described in an article entitled "New Experiments With Infra-red Photography," published in 1937 by Czerney, difficulty has been experienced in several respects. Evaporation of oil to form the necessary heat sensitive film on a membrane member requires very careful handling and protection from all external conditions which might affect the quality of the film. In producing an oil vapor necessary to the formation of the oil film there is found to occur a troublesome deterioration of the layer of absorbent material, and even when these problems are overcome it is often very difficult to view satisfactorily the image which is formed and there is always the objection that the image remains on the membrane for a very short time only.

It is, therefore, an object of the invention to deal with the problems generally indicated and to improve the quality and accuracy of formation of images on the membrane of an infra-red viewer of the class indicated.

It is further an object of the invention to devise improved methods and apparatus for infra-red viewing and for maintaining infra-red images for relatively long intervals of time, during which intervals the images may be more carefully inspected and, in many cases, permanently recorded.

Still another object of the invention is to improve the preparation and handling of membranes, both with respect to the formation of the absorbent layer which is carried on one side of the membrane and also the heat sensitive oil film which is applied at an opposite side of the membrane.

Still a further object of the invention is to devise a special optical system for viewing and simultaneously photographing an image produced by infra-red variations.

These and other objects and novel features will be more fully understood and appreciated from the following description of a preferred embodiment of the invention selected for purposes of illustration and shown in the accompanying drawings, in which—

Fig. 2 is a cross-sectional view of a novel cell construction forming a part of the apparatus shown in Fig. 1;

Fig. 3 is a diagrammatic view illustrating the optical apparatus for viewing and simultaneously photographing an image and forming a part of the device shown in Fig. 1;

Fig. 4 is a wiring diagram further illustrating the electrical operating circuit and control elements employed in conjunction with the apparatus shown in Fig. 1;

Fig. 5 is an enlarged sectional view showing the coating on a membrane, with the thickness greatly exaggerated.

Figure 1:
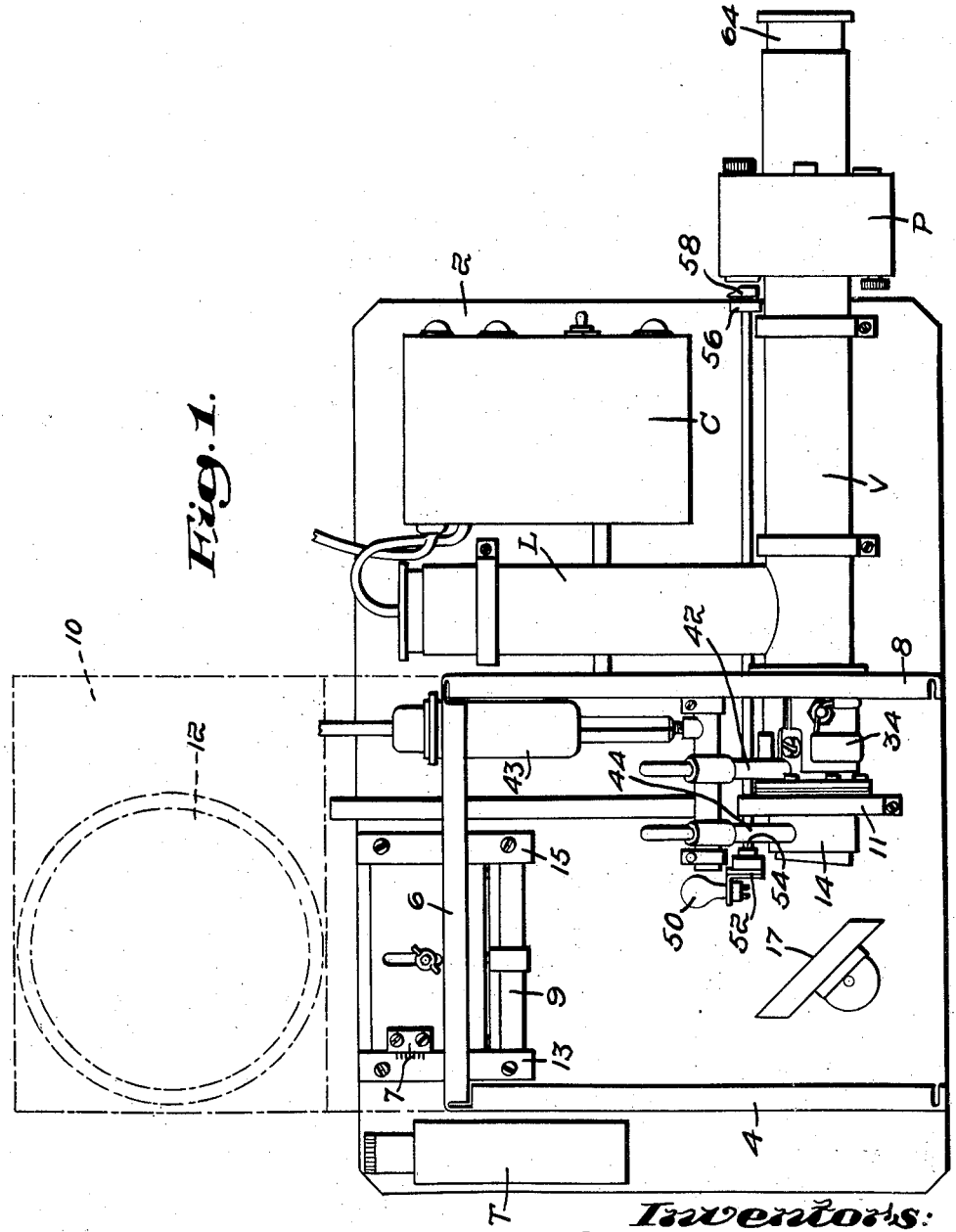
Fig. 1 is a plan view of the long wave-length infra-red viewing apparatus of the invention.

In one important aspect of the invention we have discovered certain novel apparatus and procedure which are suitable for use in connection with the Czerney method of forming an infra-red image, as outlined above, wherein an oil film of suitable characteristics is first provided on a membrane member and thereafter the membrane is exposed to infra-red radiations to produce the desired image.

In addition, however, we have further discovered a second general method of forming an infra-red image differing basically from the Czerney method in that we do not first form a film and then expose the film to radiation. On the contrary, we reverse the process and first radiate the absorbent layer of an oil-free membrane with infra-red radiations. We then condense an oil vapor on relatively cooler portions of the membrane, as well as on relatively warmer portions of the membrane occurring immediately adjacent to the cooler portions. We find that this new method is characterized by several novel features and has definite advantages both with respect to an increase in range and a wider sensitivity of the infra-red viewing process.

We have also discovered novel apparatus for carrying into effect both the Czerney method and the new method of the invention, and by means of this apparatus we have succeeded in greatly extending the period during which an image may be formed and held, and at the same time we have increased the fidelity and detail of the subject matter image.

Considering these features more in detail, attention is directed to the drawings, in which we have shown a preferred embodiment of the invention comprising a special cell assembly including a protective housing in which certain cell components may be contained. This cell assembly is designed to be mounted on a viewing stand and, together with the stand, carried about from one point of observation to another. It should be understood, however, that the invention is not intended to be limited to the particular structure illustrated but may take various other forms.

In the structure shown, numeral 2 denotes a base on which is supported vertical sides, as 4, 6 and 8, defining an enclosure for shielding the cell components. The enclosure may be covered by a suitable cover 10 which may be hinged or otherwise secured to one of the sides 6. The top is shown in Fig. 1 in a raised position. Located in this cover 10 is an opening 12 through which infra-red radiations may pass when the top is in a closed position. A shutter may be provided to close the opening, when desired.

Located within the enclosure noted and supported in a ring holder 11 fixed to the base 2 is the special cell unit if the invention. Also located within the enclosure are optical elements employed in directing infra-red rays into the cell. Located on the base 2 externally of the enclosure is an illuminating device L; a viewing device V; and a camera device P for photographing images formed in the cell unit.

The optical elements noted include a spherical mirror 9 which is adjustable in members 13 and 15, Fig. 1, to provide desired changes in focal length in accordance with a focussing scale 7. Infra-red radiations enter the enclosure at the lower left-hand side of Fig. 1, pass through the opening 12, and meet the mirror 9. From here the rays are converged upon a 45° mirror 17 which reflects the rays into the cell. Also secured to the base adjacent to the viewing system is an electrical control box C for containing electrical elements employed in the method and apparatus of the invention. A telescope T is provided at an opposite side of the enclosure on the base 2 and may be employed in selecting an object to be viewed in the cell.

In Fig. 2 of the drawings the details of the cell construction may be more clearly seen. The cell includes a hollow cylindrical casing comprised by two cylindrical sections 14 and 16 which are secured together by fastenings, as cap screws 18. Solidly held between the cylindrical sections 14 and 16 is a membrane support 20 on which is mounted a membrane 22.

The membrane support 20 is provided with sealing gaskets 24 and 26 which function to provide air-tight compartments on two sides of the membrane 22, as viewed in Fig. 2. The membrane support 20 is formed with a groove 28 which is employed to aid in forming and locating the membrane 22 in a correct position. In mounting the membrane it is normally first received on a ring element, not shown in the drawings, which element is larger than the ring support.

The membrane may, for example, be applied to the ring in the manner generally suggested in the Czerney reference above noted. That is, a small quantity of a fluid material, such as nitrocellulose, which is to constitute the membrane, is released on the surface of a liquid body and allowed to spread out into a very thin film. The ring member previously immersed in the liquid is then raised up into contact with the film and lifts the film away from the liquid to form the membrane body. While the membrane is still wet, the ring, with the membrane attached, is moved over the membrane support 20 and groove 28 and firmly pressed into place, and the membrane becomes stretched over the support 20 and adheres to the recessed land surface thereof, breaking away from the ring to leave the structure shown in Fig. 2. The membrane is then dried.

It is pointed out that this method of mounting and supporting the membrane 22 ensures that the membrane will be normal to the axis of the cell and thereby greatly simplifies the procedure of aligning the cell with the optical system hereinafter described.

The membrane 22 is of extremely thin construction when formed in the manner described, having a thickness, for example, of as small as four millionths of an inch. Therefore, no attempt has been made to show this film in section in the drawings. However, on one side of the membrane 22, which is the left-hand side of this member, as viewed in Fig. 5, there is applied, in accordance with the invention, a thin layer of material 22' which absorbs infra-red radiation and which may, for example, comprise a layer of "gold black." The gold black is applied by evaporating gold from a body of molybdenum or tungsten in an atmosphere of hydrogen or nitrogen at a pressure of two or three millimeters of mercury. A deposit having a thickness of from one to fifteen microns, for example, may be produced in this manner and is found to constitute a satisfactory absorbing layer for infra-red radiations.

At the left-hand side of the membrane, as viewed in Fig. 2, is provided a window 30 of rock salt, for example, which is transparent with respect to infra-red radiation. This window is supported at the left-hand end of the cylindrical casing section 14, as shown in Fig. 2, and thus permits infra-red radiations to pass into the cell and exert a heating effect on the absorbent layer of the membrane 22.

It is pointed out that with a membrane construction of this general character any suitable means of evaporating a film of oil on that side of the membrane which faces the cylindrical section 16 may be utilized, including a liquid container and vaporizing arrangement, such as that shown and described in the Czerney reference above noted.

However, in accordance with the invention we have devised an improved method and apparatus for producing an oil vapor in the cell. Essentially the method consists in evaporating oil from an oil reservoir body which is located around the inner periphery of the cell casing. An important feature of the apparatus to do this is an oil reservoir member 32 of an absorbent character. This oil reservoir may, for example, consist of a strip of oil absorbent paper, such as blotting paper, secured around inner peripheral wall portions of the casing section 16 by a spring 31, as illustrated in Fig. 2. An oil, such as hexadecane, for example, may be absorbed in the paper in suitable quantity. Cooperating with this absorbent oil reservoir member is a heating unit constructed and arranged to overlie the outer peripheral surface of the casing section 16 and constituting another novel feature of the invention. This heating unit may consist, for example, of a cylindrical sleeve member 34 in which is contained a coiled heating element 36. When the heater coil is energized, heat is transmitted through the casing section wall and causes evaporation of oil from the oil reservoir member 32. The oil thus evaporated seeks to condense upon the right-hand side of the membrane 22, as viewed in Fig. 2, thus producing a film which is sensitive to heating effects produced in the absorbent layer by infra-red radiations. It is pointed out that such a means of vaporizing oil can be employed in any position of the cell and offers ease of handling. More particularly the evaporating operation can be carried out without interfering with the field of view in the cell, and thus it becomes possible to view the membrane while condensation takes place.

It has been observed that in some instances excessive collection of oil on the membrane may tend to occur. We find such excess of oil may be desirably controlled by providing at outer peripheral portions of the membrane an oil absorbent ring member 38 which operates to trap oil condensing on the outer peripheral wall sections of the membrane holder and adjacent casing surfaces and thus prevents this oil from flowing down on to the membrane surface in an undesirable manner.

At the right-hand end of the cylindrical casing 16 we have further provided a viewing window 40 of special construction. Difficulty was experienced in using successfully an ordinary glass window member with a cell construction and evaporation means of the type described, an undesirable condensation of oil taking place on the inner surface of such a window and tending to obscure visibility of an image on the membrane. To avoid this difficulty we have devised a window consisting of conductive glass, sch as Nesa glass, which, along the side adjacent to the interior of the cell, is provided with an electrically conductive coating 40' and electrical means indicated as wires 67 as shown in Fig. 2 for energizing the coating. A controlled heating may thus be produced in a degree sufficient to prevent the undesirable condensation of oil on the viewing window and this is an important feature of our invention.

Since it was known from the teaching of the Czerney reference that an evaporation step may be more successfully carried out in a cell from which air has been evacuated, we have provided a special pumping device. An exhaust port 42 is connected into the right-hand side of the cell casing, as viewed in Fig. 2, and this port is connected to a suitable pumping means for evacuating air. At the same time we find that it is necessary to provide a second exhaust port 44 which is connected into the chamber occurring at the left-hand side of the membrane 22, as viewed in Fig. 2, in order that the membrane 22 will not be affected by a pressure differential which might tend to rupture this member.

In accordance with the method of the invention, therefore, the two compartments occurring on either side of the membrane 22 are simultaneously evacuated through the exhaust ports 42 and 44 in such a manner that a substantially balanced evacuating effect is maintained in operation on either side of the membrane and the membrane is thus protected. A thermo-couple gauge 43 is connected into the pump line through which air is exhausted, and this gauge is employed to facilitate control of the pumping operation.

It will be apparent that the method of vaporizing the oil described, together with the several elements which aid in successfully condensing the vaporized oil, may be used in two different types of infra-red viewing. Thus a film of oil may be first produced on a membrane member and the membrane may then be exposed to infra-red radiation to form an image in the general manner taught by the Czerney reference. Alternatively, we may employ the improved method of vaporizing to produce an image in accordance with our new method of viewing, in which infra-red radiations are first directed against the absorbent layer of the membrane to produce relatively warm and relatively cool portions at the opposite surface of the membrane from the layer. We can then vaporize the oil and condense the vapor upon the relatively cool and relatively warm portions in a selective manner which will render the desired infra-red image visible. It will therefore be seen that in this latter type of operation the ability to vaporize the oil from points around the inner periphery of the casing, rather than centrally of the chamber space, is very necessary in order to avoid any interference with the field of view.

We have also determined that in preparing and maintaining membranes in a satisfactory condition it may be desirable, in some cases, to be able to quickly and conveniently remove a used oil film from the membrane. With this in mind we have further devised a novel heating unit by means of which we may carry out a film erasing step, as well as securing certain other advantages. This heating unit is best shown in Fig. 1 at the left-hand side of the cell unit, and comprises a clearing lamp 50 which is mounted on a bracket 52 fixed at one end of an operating rod 54. The latter member is rotatably mounted through the side wall 8 and at its outer end is received in a bearing 56 so that the lamp and bracket may be swung through a circular path into a position in which heat from the lamp, when energized, is directed into the cell against the membrane 22 and operates to evaporate or erase a film thereon. Operatively connected to the rod 54 is a switch 58 which may automatically close a circuit energizing the lamp 50 when the rod is rotated in the manner above described and which may interrupt the lamp circuit when the lamp is returned to the position shown in Fig. 1.

The clearing lamp arrangement described comprises one desirable means for producing a heating effect, and it is intended that this clearing lamp be regarded as illustrative of various other devices for thus generating and directing heat into the cell and particularly against the membrane.

In addition to comprising a means for erasing an oil film on the membrane, we may also employ a heating agent, such as the clearing lamp, to prevent formation of an oil film, or to desirably modify the formation of an oil film. Also in the course of development of the use of the clearing lamp we have further discovered that we may advantageously utilize a heating agent of this character in conjunction with the heating element 34 utilized to produce evaporation from the oil reservoir member 32.

Specifically, these two heating devices, i. e., lamp 50, and heating element 34, may be very desirably utilized in cooperative relationship with one another for the purpose of more effectively carrying out our new method of condensing vapors to form an image on the membrane referred to at an earlier point in the specification.

Since in this method infra-red radiations are first directed against the absorbent layer on the membrane 22 to cause certain portions of the membrane at the side opposite the layer to become raised in temperature, we can augment the heating effect of the infra-red rays to sharply control condensation on the membrane. Thus, when evaporation of oil is allowed to take place, an excess or deficiency of evaporated oil may be, to some extent, compensated for by varying the heat of lamp 50. It is pointed out that another important feature of the invention is this modified way of condensing oil on the membrane. For example, by adjusting the temperature of the lamp 50 and element 34 we may extend the period during which an image is formed and held.

The increased length of time during which an image may be formed and held makes it more feasible to carry out permanent recording of images, and we have devised a novel method and apparatus for viewing and simultaneously photographing an image formed on the membrane.

This apparatus is more clearly shown in Fig. 3, wherein we have illustrated the viewing device V and illuminating device L with a lamp 60 which directs light against a 50% reflecting mirror 62, and thence on to an image on the membrane. At the outer end of the tubular viewing member V is an eye piece 64 through which the image may be seen. In order to permit light from the membrane image to be passed through to the eye piece and also to the camera P, we have further provided a mirror 66 which, as shown in Fig. 3, is designed to reflect approximately 80% of the light from the image in a right-angular direction against the light sensitive element of the camera P. The remaining percentage of the light is passed through the mirror 66 to the eye piece.

In Fig. 4 there is illustrated diagrammatically one suitable circuit arrangement for energizing the various electrical elements of the invention, and the cell heater 34, clearing lamp 50, conductive glass window 40, and switch 58 for lamp 50, have all been indicated diagrammatically.

It will be evident from the foregoing description that we have provided an improved method and apparatus for long range infra-red viewing by means of which a wider range of operation is achieved and a more exact reproduction of subject matter can be realized.

We claim:

1. In an infra-red viewing apparatus of the class described, a closed casing through which infra-red radiations may pass, a membrane supported therein, an infra-red absorbent layer overlying one side of the membrane, means within the casing for producing a vapor to be condensed on the membrane, and means for excluding the vapor from the said absorbent layer.

2. A structure according to claim 1, in which the means for excluding vapor comprises a membrane support for dividing the casing interior into two separate compartments.

3. A structure according to claim 1, in which the casing comprises a cylindrical body and said means for excluding vapor comprises an annular membrane support secured to the inner periphery of the casing in sealed relationship therewith.

4. A structure according to claim 2, including means for removing air from the casing at points occurring on either side of the membrane.

5. In an infra-red viewing apparatus of the class described, a closed casing having an infra-red transparent window therein, a membrane supported in the casing, an infra-red absorbent layer overlying one side of the membrane, means within the casing for producing a vapor to be condensed on the membrane, means for excluding the vapor from the said absorbent layers, said means for excluding vapor including a membrane support constructed and arranged to divide the casing interior into two compartments, means for simultaneously exhausting air from each of the said compartments, and means for viewing the condensation of vapor on the membrane.

6. In an infra-red viewing apparatus of the class described, a closed casing through which infra-red radiations may pass, a membrane supported therein, an infra-red absorbent layer received on one side of the membrane, and means located at the inner wall portions of the casing for releasing a vapor to be condensed on the membrane on the side opposite to that side which bears the infra-red absorbent layer.

7. In an infra-red viewing apparatus of the class described, a closed casing transparent to infra-red radiations, a membrane supported therein, an infra-red absorbent layer on one side of the membrane, means consisting of an absorbent oil reservoir body supported internally of the casing, and means for heating the absorbent oil reservoir body to release a vapor to be condensed on the said membrane.

8. A structure according to claim 7, in which the absorbent reservoir body comprises a relatively thin strip of material secured to an inner wall portion of the casing.

9. A structure according to claim 7, in which the means for heating the oil reservoir body comprises an electrical heating element mounted externally of the casing.

10. A structure according to claim 7, in which the means for heating the oil reservoir body comprises a carrier member secured externally of the casing at points immediately adjacent to the oil reservoir body, and an electrical heating element received in said carrier member.

11. In an infra-red viewing apparatus, a closed casing through which infra-red radiations may pass having windows mounted therein, a membrane supported within the casing, an infra-red absorbent layer overlying one side of the membrane, means including an annular heating member for producing a vapor within the casing, means for excluding the vapor from said absorbent layer, the said means for excluding vapor comprising a membrane support which divides the casing interior into two separate compartments, and the means for producing vapor being located in the compartment from which the absorbent layer is excluded, and adjustable heating means movable into a position to evaporate vapor condensed on the said membrane.

12. A structure according to claim 1, including an oil collecting ring of absorbent material located adjacent to peripheral edge portions of the said membrane.

13. A structure according to claim 1, including a window in the casing, said window having an electrically conductive coating thereon, and means for heating said coating.

14. A structure as defined in claim 1, including a heating device adjustably supported at one side of the casing to direct heat against the membrane.

15. A structure according to claim 1, including a heating lamp located in front of said membrane, means for moving the lamp into and out of register with the membrane, and means responsive to movement of the lamp for closing an electrical circuit in which the lamp is connected.

16. A structure according to claim 1, including an apparatus for viewing and simultaneously photographing an image formed on the membrane.

17. A structure according to claim 1, including an apparatus for viewing and simultaneously photographing an image formed on the membrane, said apparatus including a camera and a mirror for directing a portion of reflected light from the image to the camera while permitting the remainder of the reflected light to pass therethrough to a viewing point.

18. That improved method of long wave-length infra-red viewing, which comprises interposing in the path of infra-red radiations from an object which is being viewed, a membrane bearing an infra-red absorbent layer, and then selectively condensing on the side of the membrane opposite from the side bearing the said layer a vapor occurring with thickness differences producing light interference phenomenon which defines an image of the said object.

References Cited in the file of this patent

UNITED STATES PATENTS

| 2,418,523 | Neddermeyer et al. | Apr. 8, 1947 |
| 2,424,976 | Golay et al. | Aug. 5, 1947 |
| 2,435,519 | Tolson | Feb. 3, 1948 |
| 2,553,179 | Farr et al. | May 15, 1951 |
| 2,557,096 | Golay | June 19, 1951 |
| 2,583,221 | Martin | Jan. 22, 1952 |

OTHER REFERENCES

"Pneumatic Heat Detector" by Zahl et al., published in The Review of Scientific Instruments, vol. 17 No. 11, November 1946, pages 511–515.